(12) United States Patent
Duocastella et al.

(10) Patent No.: US 10,775,602 B2
(45) Date of Patent: Sep. 15, 2020

(54) MICROSCOPY METHOD AND APPARATUS FOR OPTICAL TRACKING OF EMITTER OBJECTS

(71) Applicant: FONDAZIONE ISTITUTO ITALIANO DI TECNOLOGIA, Genoa (IT)

(72) Inventors: Marti Duocastella, Arenzano (IT); Giuseppe Sancataldo, Bagheria (IT); Alberto Diaspro, Genoa (IT)

(73) Assignee: FONDAZIONE INSTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 16/479,808

(22) PCT Filed: Jan. 16, 2018

(86) PCT No.: PCT/IB2018/050257
§ 371 (c)(1),
(2) Date: Jul. 22, 2019

(87) PCT Pub. No.: WO2018/134730
PCT Pub. Date: Jul. 26, 2018

(65) Prior Publication Data
US 2020/0142174 A1    May 7, 2020

(30) Foreign Application Priority Data
Jan. 23, 2017    (IT) ........................ 102017000006925

(51) Int. Cl.
*G02B 21/36*    (2006.01)
*H04N 13/128*    (2018.01)
(Continued)

(52) U.S. Cl.
CPC ......... *G02B 21/365* (2013.01); *G02B 21/025* (2013.01); *G02B 21/08* (2013.01);
(Continued)

(58) Field of Classification Search
CPC ................ G02B 21/361; G02B 21/362; G02B 27/0075; G02B 21/22
See application file for complete search history.

(56) References Cited

U.S. PATENT DOCUMENTS

| | | | |
|---|---|---|---|
| 6,201,899 B1 * | 3/2001 | Bergen | G06K 9/00134 382/106 |
| 2014/0008549 A1 * | 1/2014 | Theriault | G02B 26/105 250/459.1 |

(Continued)

OTHER PUBLICATIONS

Sun et al., "Parallax: High Accuracy Three-Dimensional Single Molecule Tracking Using Split Images" Nano Letters, vol. 9, No. 7, pp. 2676-2682 (Jun. 4, 2009).
(Continued)

*Primary Examiner* — Rowina J Cattungal
(74) *Attorney, Agent, or Firm* — Volpe and Koenig, P.C.

(57) ABSTRACT

Microscopy method and apparatus for determining the positions of emitter objects in a three-dimensional space that comprises focusing scattered light or fluorescent light emitted by an emitter object, separating the focused beam in a first and a second optical beam, directing the first and the second optical beam through a varifocal lens having an optical axis such that the first optical beam impinges on the lens along the optical axis and the second beam impinges decentralized with respect to the optical axis of the varifocal lens, simultaneously capturing a first image created by the first optical beam and a second image created by the second optical beam, and determining the relative displacement of the position of the object in the first and in the second image,
(Continued)

wherein the relative displacement contains the information of the axial position of the object along a perpendicular direction to the image plane.

17 Claims, 8 Drawing Sheets

(51) Int. Cl.

| | | |
|---|---|---|
| *H04N 13/167* | (2018.01) | |
| *H04N 13/254* | (2018.01) | |
| *H04N 13/239* | (2018.01) | |
| *G02B 21/02* | (2006.01) | |
| *G02B 21/08* | (2006.01) | |
| *G02B 21/16* | (2006.01) | |
| *G06K 9/00* | (2006.01) | |
| *H04N 5/232* | (2006.01) | |
| *H04N 5/235* | (2006.01) | |
| *G02B 21/22* | (2006.01) | |
| *H04N 13/00* | (2018.01) | |

(52) U.S. Cl.
CPC ............ *G02B 21/16* (2013.01); *G02B 21/22* (2013.01); *G02B 21/361* (2013.01); *G06K 9/00134* (2013.01); *H04N 5/2352* (2013.01); *H04N 5/23212* (2013.01); *H04N 13/128* (2018.05); *H04N 13/167* (2018.05); *H04N 13/239* (2018.05); *H04N 13/254* (2018.05); *H04N 2013/0081* (2013.01); *H04N 2013/0085* (2013.01); *H04N 2013/0096* (2013.01)

(56) References Cited

U.S. PATENT DOCUMENTS

| | | | |
|---|---|---|---|
| 2014/0192166 A1 | 7/2014 | Cogswell et al. | |
| 2017/0078549 A1* | 3/2017 | Emtman | H04N 5/2254 |
| 2017/0318216 A1* | 11/2017 | Gladnick | G02B 21/367 |
| 2019/0162945 A1* | 5/2019 | Hua | H04N 5/2256 |

OTHER PUBLICATIONS

Liu et al., "Extended depth-of-field microscopic imaging with a variable focus microscope objective", Optics Express, vol. 19, No. 1, pp. 353-362 (Jan. 3, 2011).

Duocastella et al., "Three-dimensional particle tracking via tunable color-encoded multiplexing", Optics Letters, vol. 41, No. 5, pp. 863-866 (Mar. 1, 2016).

Ram et al., "High Accuracy 3D Quantum Dot Tracking with Multifocal Plane Microscopy for the Study of Fast Intracellular Dynamics in Live Cells", Biophysical Journal, vol. 95, pp. 6025-6043 (Dec. 2008).

Toprak et al., "Three-Dimensional Particle Tracking via Bifocal Imaging", Nano Letters, vol. 7, No. 7, pp. 2043-2045 (Jul. 11, 2007).

Small et al., "Fluorophore localization algorithms for super-resolution microscopy", Nature Methods, vol. 11, No. 3, pp. 267-279 (Mar. 2014).

Patterson et al. "Superresolution Imaging using Single-Molecule Localization", Annual Review of Physical Chemistry, vol. 61, pp. 345-367 (Jan. 4, 2010).

* cited by examiner

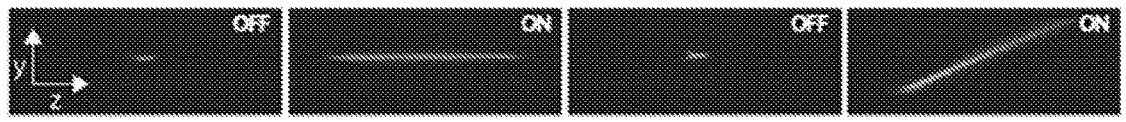
FIG. 7A      FIG. 7B      FIG. 7C      FIG. 7D
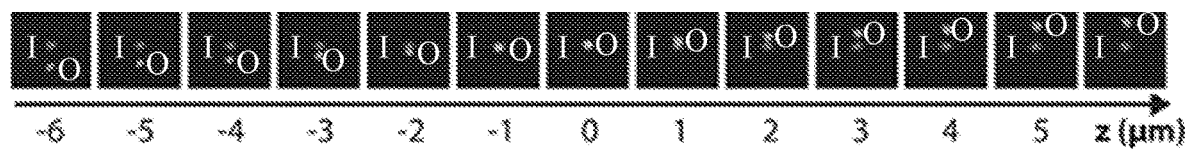
FIG. 8
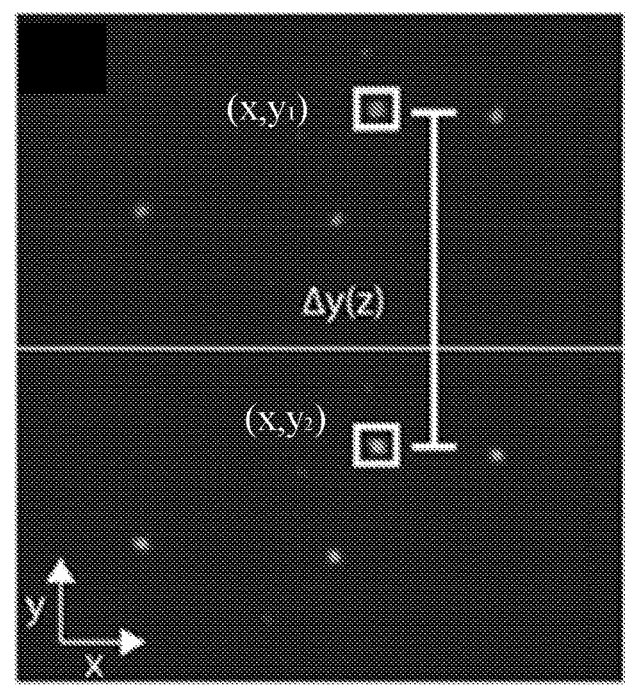
FIG. 9A
FIG. 9B

MICROSCOPY METHOD AND APPARATUS FOR OPTICAL TRACKING OF EMITTER OBJECTS

CROSS REFERENCE TO RELATED APPLICATIONS

This application is a 35 USC § 371 national stage application of PCT/IB2018/050257, which was filed Jan. 16, 2018, and claimed priority to IT 102017000006925, filed Jan. 23, 2017, both of which are incorporated herein by reference as if fully set forth.

FIELD OF THE INVENTION

The present invention relates to a microscopy method and apparatus for determining the 3D position of an emitter, in particular for the three-dimensional optical tracking of nanometric emitters.

BACKGROUND OF THE INVENTION

The development of efficient and rapid technologies for the optical tracking of individual molecules or particles makes it possible to investigate dynamic biological processes or the rheological behaviour of complex fluids, such as polymer networks, often in a non-invasive manner. Interest is generally directed at the ability to create well focused images of an object in a 3D volume.

In most cases, the nanometric object is a fluorescent emitter, whose signal is collected using a "wide-field" detection system, in which the entire field of view of a microscope is illuminated with simultaneous detection of the fluorescence emitted using a camera. Superposing multiple frames detected in sequence and using appropriate interpolation procedures, it is possible to obtain the two-dimensional localisation of the emitter.

The typical resolution of a microscope in visible light causes nanometric objects spread out in a sample appear in the image as luminous diffraction spots. The impulsive response of an optical instrument is commonly defined by the Point Spread Function (PSF), i.e. the amplitude distribution of the electromagnetic field on the image plane when a point source is observed. In the case of a non-point source, for example in the case of particles of at least a few tens of nm, the apparent dimension of the particle substantially corresponds to the dimension of the luminous spot and it is the convolution of the real dimension with the PSF.

Two main questions have been addressed in the development of techniques for the localisation of a single emitter in a volume instead of in a plane, i.e. the 3D localisation.

The first question pertains to the loss of efficiency of photonic collection from objects positioned outside the focal plane. In this case, single emitters do not appear as spots but as diffraction rings. The diffusion of light in rings with the consequent loss of the measured intensity results in decreased precision in the 2D localisation outside the focal plane until reaching an inability to localise the emitter. A second point resides in the fact the axial symmetry along the z-axis of the PSF in common microscopes does not allow discriminating whether an object is positioned at a distance $\Delta z$ above or below the focal plane.

In other words, the axial distance traveled by a particle in a plane (x,y) can be determined by measuring the diameter of the first diffraction ring (if the dimension of the particle is known), however, it is not possible to determine, along the z-axis, whether the particle moved above or below the focal plane.

Moreover, the reduction of the signal/noise ratio when the particle moves out of focus limits in fact the axial distance within which the particle is visible.

A system for 3D tracking of a single fluorescent molecule, called Parallax, was presented in "*Parallax: High Accuracy Three-Dimensional Single Molecule Tracking Using Split Images*" di Y. Sun et al., Nano Letters, vol. 9, pages 2676-2682 (2009). The light beam emitted by an object is collimated by a lens positioned at a focal length to the primary image and separated in two optical paths by mirrors positioned at an additional focal length. The two optical paths form two images on the upper and lower part of the camera separated by a distance $\Delta y_1$. When the object if out of focus, the beam is no longer collimated and the separate images formed on the camera are closer or farther away to or from each other in the y direction, with separation $\Delta y_2$. The separation between $\Delta y_1$ and $\Delta y_2$ provides the signal to measure the displacement of the object along the z axis, while the positions in the plane (x,y) are obtained by the average of the positions in the two images.

The application US 2014/0192166 describes a microscope for generating a 3D image of an object that comprises a first and a second detector, an optical system that includes a waveplate between the 3D object and the detectors, wherein the waveplate is configured in such a way that the optical system simultaneously produces a depth of field extended to the second detector and the depth-encoded image exhibits a PSF that maps the positioning in various points inside the 3D object.

Use of a lens with variable/tunable focal length, often indicated with a varifocal lens, in a microscope, when positioned in a conjugated plane of the rear focal plane of the microscope lens, makes it possible to obtain focused images on the focal planes selectable by a user. If the speed of displacement of the focal spot of a varifocal lens is greater than the exposure time of the detector, the information on multiple plane can be integrated in a single image capture, creating an extended depth of field (EDOF) effect.

Sheng Liu and Hong Hua in "*Extended depth-of-field microscopic imaging with a variable focus microscope objective*", published in Optics Express, vol. 19, pages 353-362 (2011), have a microscope able to capture EDOF images in a single captured image. The volumetric optical sampling method uses a rapid scan of the focus of a varifocal objective lens through the extended depth of a thick sample during a single exposure of a detector. The captured image is the fusion of infinite sections (slices) of image within the focal interval of the objective lens and an EDOF image is reconstructed by applying the deconvolution technique. In the optical system used, a miniature liquid lens is attached to the rear surface of the objective. The simultaneous imaging of multiple focal planes was applied in "wide-field" microscopes to extend the axial tracking of a nanometric emitter.

M. Duocastella et al. in "*Three-dimensional particle tracking via tunable color-encoded multiplexing*", published in Optics Letters Vol. 41, Issue 5, pp. 863-866 (2016), describe a method for 3D tracking in light field optical microscopy using multiple, selectable focal planes. A lens with electronically tunable focal length and high speed is synchronised with three different sources of monochromatic light, each with different colour, red, white and blue (RGB). The control electronics makes possible the selection and independent control of the position whereat each colour is focused. In this way, each individual exposure by means of a colour camera simultaneously captures the three colours corresponding to the three different focal planes. The authors observe that measuring the diameter and the position of the centroid of the diffraction rings for each of the three focal planes allows the localisation and tracking of individual objects in significantly larger axial intervals than those obtainable with conventional approaches with single focal plane.

S. Ram et al. "*High Accuracy 3D Quantum Dot Tracking with Multifocal Plane Microscopy for the Study of Fast Intracellular Dynamics in Live Cells*", published in Biophys J. (2008); vol. 95(12), pages 6025-6043, describe a localisation algorithm for determining the 3D position of a point source in a multifocal plane microscopy image mode, in which the simultaneous imaging of two distinct planes within the sample is generated.

SUMMARY OF THE INVENTION

The Applicant has observed that the Parallax technique described by Y. Sun et al. can generally work in an axial interval in the z axis (i.e. outside the image plane) that is relatively limited, often smaller than 1 μm, because, when an emitter exits the focus, it appears as a diffraction ring, thus preventing an accurate localisation in the plane (x,y).

With the use of a varifocal lens actuated at an axial displacement velocity of the focused optical beam that is greater than the time of exposure of the detection system, the multiplanar information can be integrated in a single image capture, creating an EDOF effect. This makes it possible to concentrate the fluorescence light in a relatively small region, in order to maintain a high signal-noise ratio and to reduce potential superpositions between particles near each other. A single emitter situated inside the EDOF thus appears to be focused in the image and its coordinates (x,y) can be determined with sufficient precision.

The Applicant has observed that the concentration of light in the EDOF region created by the varifocal lens takes place at the expense of a loss of information on the axial position of the particle, outside the image plane. In an image acquired "in-axis", i.e. along the optical axis of the objective lens of the imaging system, the single emitter is represented by a focal spot in the image plane (x,y), which encloses the information on its axial position in a direction z perpendicular to the plane, however this information is not recognisable.

The simultaneous imaging of multiple focal planes of the method described in the aforementioned paper by Duocastella et al. is able to extend the axial distance with respect to other conventional, single plane approaches. However, use of more than two measurement planes leads to a reduction of the signal-to-noise ratio. Moreover, the particle localisation precision depends on the position of the focal planes and in general it is not uniform. The Applicant has then noted that method can be difficult to implement in the case of tracking of fluorescent particles and it is not possible to use more than three focal planes.

The Applicant has understood that if, simultaneously with a first image acquired with a first optical beam in-axis with respect to the optical axis of the varifocal lens, a second image is captured, created by a second optical beam that is off-axis with respect to the optical axis of the varifocal lens, the comparison between the two images contains the axial information of a single emitter, encoded in a lateral shift, $\Delta y$ or $\Delta x$, on one of the two axes of the image plane, between the position of the emitter in the first image and the position of the same emitter in the second image. The lateral shift of the emitter on one or on both the axes of the image plane is defined by the decentralizing of the second optical beam with respect to the optical axis of the varifocal lens, in particular by the offset distance between the second optical beam and the first optical beam in-axis.

The Applicant has noted that there is a linear relationship between the lateral displacement of the emitter, due to the decentralizing of the second beam, and the axial position of the emitter. Hereinafter, reference shall be made to an emitter object, preferably with nanometric size, for example a fluorescent molecule, which emits scattered light or fluorescent light when illuminated by an optical beam.

In the present description, the "axial position" of an emitter object means the position outside the plane of a detected image, preferably perpendicular to the plane of the image. The plane (x,y) shall indicate the plane of the image and z shall indicate the axial direction perpendicular to the plane (x,y).

The Applicant has observed that there is a linear relationship between the axial position, $z_p$, of a single emitter and the focal length, $f_{TL}$, of varifocal lens, which varies within a range of values, generally selectable by a user. Therefore, the quantification of $\Delta y$ makes it possible to extract $z_p$ with high accuracy within the EDOF region created by the varifocal lens.

Regulating one or more parameters of the imaging system, such as the offset distance of the second beam from the optical axis of the varifocal lens and the range of values of focal length $f_{TL}$, it is possible to change the tracking area of the emitter object and/or the accuracy of its axial position.

In accordance with the present disclosure, a microscopy method is provided for determining the position of one or more emitter objects in a three-dimensional (3D) space which comprises:

a) illuminating an emitter object so as to cause an emission of scattered light or fluorescent light from the emitter object;

b) focusing the emitted light in a primary focused optical beam through an objective lens; c) splitting the primary optical beam in a first secondary beam and in a second secondary beam;

d) directing the first and the second secondary beam through a varifocal lens, having an optical axis, along respective optical paths such that the first secondary beam impinges on the varifocal lens along a direction corresponding to said optical axis and the second secondary beam impinges decentralized on the varifocal lens at an offset distance $\Delta d$ from the optical axis and along a direction parallel to the same, in which the varifocal lens has an electronically controllable focal length, e) electronically controlling the focal length of the varifocal lens changing the focal length through a range of focal length values so as to move the respective focal positions of the first and second beam along said optical axis through said range of focal length values in a predetermined travel time, f) simultaneously acquiring a first image and a second image of the emitter object in an integration time greater than or equal to the travel time of the focal positions simultaneously detecting the first secondary beam in-axis and the decentralized second secondary beam in respective first detection area and second detection area arranged on an image plane (x, y);

g) analyzing the first and the second image for determining a first position of the object on the first image and a second object position on the second image and determining a relative displacement Δr in the image plane (x,y) of the position of the object in the first and in the second image, and h) determining an axial position $z_p$ of the emitter object along an axis z perpendicular to the image plane on the basis of Δr.

Preferably, after step h), the method comprises: i) associating the coordinates defined by the first position on the image plane (x,y) and by the axial position $z_p$ with the 3D position of the emitter object.

Preferably, in the step h), the axial position $z_p$ is determined on the basis of a linear relationship between $z_p$ and Δr.

Preferably, the emitter object has nanometric dimension.

Preferably, the step of simultaneously acquiring a first image and a second image of the emitter object comprises simultaneously acquiring a plurality of respective first and second images at successive instants so as to trace the 3D position of the object over time.

Preferably, the successive instants of synchronous acquisition of first and second images are separated from each other by a longer time interval than the integration time of the at least one photodetector device.

Preferably, the steps from the acquisition of the first and of the second image to the determination of the 3D position of the emitter object are carried out automatically.

In some embodiments, the method is a fluorescence microscopy method and the emitter object is a nanometric fluorescent object.

The focal length of the varifocal length is electronically tunable through an electronic control signal. An electronic control of the focal length of the lens has the advantage of achieving a relatively fast displacement of the focus of the lens, along the optical axis thereof, with controlled displacement speed. To create the effect of an EDOF, the displacement speed is selected so as to travel through a determined interval of focal lengths in a travel time that is lower than or equal to the time of exposure of the detector device for the collection of the light that hits its photosensitive area, i.e., the time during which the sensor actively collects the photons for the acquisition of a snap shot, indicated also as integration time.

Preferably, electronically controlling the focal length of the varifocal length is achieved in such a way as to produce a continuous change of the focal length through said interval of values of focal length.

Preferably, the control signal of the varifocal length is frequency modulated, in which the frequency $v_{TL}$ determines the axial displacement speed of the focal spot. For equal paths of the focal spot, an increase in the frequency $v_{TL}$ implies an increase in the axial displacement speed. To create the EDOF effect, periodic modulation of the focal length of the lens is selected at a higher rate than the integration time. For example, if the detector is a CCD with integration time of 100 ms, the modulation frequency with which the varifocal length operates is selected at a value that is equal to or greater than 10 Hz.

Since the first and the second secondary beam are synchronous to each other, the electronic control of the varifocal lens produces a same change of the focal length in each secondary optical beam, causing an equal EDOF effect in the corresponding image.

The first and the second images acquired simultaneously are associated to a same time instant, in which the same object can occupy two different positions in the image plane (x,y) depending on its axial position.

The first and the second image acquired in the step f) of the method are preferably digital images.

Preferably, subsequently to focusing the light emitted in a primary optical beam and prior to splitting the primary optical beam into a first secondary beam and into a second secondary beam, the method comprises directing the primary optical beam through a relay optical unit having a magnification ratio, the relay optical unit being arranged on a rear focal plane of the objective lens. The relay optical unit is configured for transferring an image formed by the objective lens to an image plane conjugate with an image magnification ratio.

Preferably, the relay optical unit is a telecentric optical system from the image side on the rear focal plane of the objective lens.

Preferably, the magnification ratio is 1:1.

Preferably, the relay optical unit comprises a first converging lens and a second converging lens, the second converging lens being arranged so as to receive the primary optical beam that has passed through the first converging lens.

In the embodiments described hereafter, the first and the second secondary beam are focused in the image plane by means of a tube lens arranged so as to receive the first and the second secondary beam that have passed through the varifocal lens and configured to focus the first and the second secondary beam in an intermediate plane that coincides with the image plane. The intermediate focus plane of the tube lens corresponds to a value of focal length included in said interval of values of focal length of the varifocal lens.

In some embodiments, the first position of the object is defined in the image plane by the coordinates $(x_1, y_1)$, the relative displacement between the first position and the second position z in the image plane is $\Delta r = \sqrt{\Delta x^2 + \Delta y^2}$, and the axial position $z_p$ of the emitter object along the z axis is determined in accordance with a relationship $\Delta r = C' \cdot z_p$, in which C' is a conversion factor.

Preferably, the offset distance Δd of the second secondary beams from the optical axis of the varifocal lens is along one of the two coordinates that define a plane perpendicular to the optical axis so as to produce a lateral displacement $\Delta r = \Delta y$ between the first and the second position of the object along one of the two coordinates of the image plane (x,y). Preferably, the axial position $z_p$ of the emitter object along the z axis is determined in accordance with a linear relationship $\Delta y = C \cdot z_p$, in which C is a conversion factor. In the preferred embodiments, the conversion factor is a proportionality constant.

The 3D position of the object is defined by $(x_1, y_1, z_p)$.

In accordance with the present invention, with a single snap shot of the at least one photodetector device it is possible to obtain the information on the 3D position of an emitter object contained in a sample.

The interval of the axial displacement of the emitter object, which can be measured along the z axis, can be modified by changing at least one of the ends of the interval of the focal length of the varifocal lens. In some embodiments, the range of trackable axial displacements is between 0 and 20 μm.

The accuracy of the axial position within the EDOF created by the varifocal lens can be controlled by changing the offset distance of the decentralized beam with respect to the beam in axis. In some exemplary embodiments, it is possible to obtain an accuracy δz on the axial position that is lower than 100 nm.

Therefore, the present microscopy technique offers flexibility in selecting some parameters of the optical imaging system, making it possible to prefer a broader interval of axial tracking of a single emitter or a higher accuracy in the axial localization thereof, depending on the application.

The quantification of the lateral displacement Δy, or more generically the determination of the displacement Δr, of the emitter object in the image plane relative to the first position because of the decentralization of the optical detection beam, can be carried out using a cross correlation algorithm of the two images or an interpolation function. Preferably, in step g), determining a relative displacement Δr in the image plane (x,y) is achieved using a cross-correlation algorithm between the first and the second image.

In one embodiment, the lateral displacement Δy is calculated using an algorithm based on the cross-correlation analysis of a portion of a first image and of a portion of the second image, each image portion containing the emitter object.

Preferably, the value of the conversion factor, C or C'=$\sqrt{2}$C, for the quantification of the position in the z axis, is determined using a calibration function obtained detecting the lateral displacement of a particle displaced axially along z by one or more known quantities.

In an embodiment, the conversion factor C is determined carrying out the steps from a) to f) of the method, in which the offset distance Δd of the second secondary beam from the optical axis of the varifocal lens is such as to cause a lateral displacement Δy between the first and the second position of the object along one of the two coordinates of the image plane (x,y) and the emitter object has a fixed position in the image plane, in which:

step f) comprises simultaneously acquiring a plurality of respective first and second images at successive instants moving the emitter object only along the axial direction z in predetermined axial positions between successive acquisitions of first and second images, step g) comprises determining a relative displacement Δy of the y coordinate of the object in the two images for each acquisition of a first and second image and hence for each predetermined axial position, and step h) is replaced by a step that comprises calculating a linear interpolation function that has as its input values the predetermined axial positions and the respective relative displacements Δy so as to determine the conversion factor as angular coefficient of the interpolation function.

In some embodiments, simultaneously acquiring the first and the second image is carried out by a two-dimensional image sensor which comprises an array of photosensitive elements which extend in the image plane (x,y) in a detection area which comprises the first detection area and the second detection area.

In other embodiments, simultaneously acquiring the first and the second image comprises acquiring the first secondary beam through a first two-dimensional image sensor and acquiring the second secondary beam through a second two-dimensional image sensor, wherein the first and the second two-dimensional image sensors are mutually synchronized and each image sensor comprises a respective array of photosensitive elements defining a respective first and second detection area in the image plane (x,y).

Preferably, the at least one two-dimensional image sensor is a photocamera or a digital television camera.

Preferably, splitting the primary optical beam into a first secondary beam and a second secondary beam comprises transmitting the primary beam through a beam splitter configured for power-splitting the beam.

Preferably, the beam splitter is configured in such a way as to produce a first secondary beam and a second secondary beam which propagate along two distinct directions not parallel to each other and step d) of the method comprises directing at least one between the first and the second secondary beam through a directing optical system configured such that the first and the second secondary beam, in output from the directing optical system, propagate along two distinct and mutually parallel directions.

In an additional embodiment, the primary optical beam passes through a relay optical unit, the relay optical unit is formed by a first and by a second converging lens arranged along the optical path of the primary beam and the conversion factor C is determined by the relationship C=($f_t$·Δd/$M_R^2$·$f_o^2$), wherein $f_t$ is the focal length of the tube lens, $f_o$ the focal length of the objective lens and $M_R$=−$f_{R1}$/$f_{R2}$, wherein $f_{R1}$ and $f_{R2}$ are the respective focal lengths of the first and of the second converging lens.

In accordance with the present disclosure, a microscopy apparatus is provided for determining the position of one or more emitter objects in a three-dimensional (3D) space which comprises:

an objective lens configured for collecting light emitted by an emitter object and focusing the emitted light in a primary light beam;

a beam splitter arranged for receiving the primary optical beam and configured for power-splitting the primary optical beam in a first secondary optical beam and a second secondary optical beam;

a varifocal lens with electronically tunable focal length and having an optical axis, the varifocal lens being arranged downstream of the beam splitter;

an optical beam directing optical system for directing at least one between the first secondary optical beam and the second secondary optical beam, the directing optical system being arranged between the beam splitter and the varifocal lens and configured such that the first and the second secondary beams exiting from the directing optical system, propagate along two distinct and mutually parallel directions;

at least one photodetector device arranged so as to receive the first and the second secondary beam in output from the varifocal lens, wherein the varifocal lens and the directing optical system are arranged in such a way that the first secondary optical beam impinges on the varifocal lens along its optical axis and the second secondary optical beam impinges on the varifocal lens decentralized along a direction parallel to the optical axis and at an offset distance Δd from the same, and the at least one photodetector device is configured for simultaneously detecting the first secondary beam and the second secondary beam on a respective first and second detection area to form at least one two-dimensional image in an image plane (x, y), said two-dimensional image comprising respective first image of the emitter object formed on the first detection area by the first beam in axis and the second image of the same emitter object formed on the second detection area by the second decentralized beam.

Preferably, the varifocal lens is configured to be electronically controlled by setting a variation in the focal length through a range of focal length values so as to move the respective focal positions of the first and second beam along the optical axis of the varifocal lens through said range of focal length values in a predetermined travel time and the at least one detector device is configured for forming the at least one two-dimensional image in an integration time greater than or equal to the travel time.

Preferably, the microscopy apparatus further comprises:
a relay optical unit positioned on a rear focal plane of the objective lens and arranged in such a way as to receive the primary optical beam upstream of the beam splitter, the relay optical unit being configured for transferring an image formed by the objective lens to an image plane conjugate with a magnification ratio.

Preferably, the relay optical unit is a telecentric optical system with a magnification ratio of 1:1.

Preferably, the microscopy apparatus further comprises a data processing device connected to the at least one photodetector device configured for:
receiving the first image and the second image of the emitter object;
analyzing the first and the second image for determining a first position of the object on the first image and a second position of the object on the second image;
determining a relative displacement $\Delta r$ in the image plane (x,y) of the position of the object in the first and in the second image;
determining an axial position $z_p$ of the emitter object along an axis z perpendicular to the image plane on the basis of $\Delta r$, and
associating the coordinates defined by the first position on the image plane (x,y) and by the axial position $z_p$ with the position (x,y,z) of the emitter object.

Preferably, the at least one photodetector device is a two-dimensional image sensor which comprises an array of photosensitive elements that extend in the image plane (x,y).

Preferably, the microscopy apparatus further comprises a tube lens arranged so as to receive the first and the second secondary beam that have passed through the varifocal lens and configured for focusing the first and the second secondary beam in an intermediate plane that coincides with the image plane.

BRIEF DESCRIPTION OF THE FIGURES

The present invention will be described in more detail below with reference to the accompanying drawings, in which some embodiments of the invention are shown. The drawings that illustrate the embodiments are schematic representations, not drawn to scale.

FIGS. 7A and 7B show the experimental PSF, in the plane (y,z), for the positions of a fluorescent microsphere measured with the beam in axis, according to an embodiment of the present invention.

FIGS. 7C and 7D show the experimental PSF for the positions of the microsphere of FIGS. 7A and 7B, with the beam off axis.

FIG. 8 é is a series of portions of images, in which each image shows the position of the microsphere acquired with the beam in axis, position "I", and with the optical beam off axis, "O".

FIGS. 9A and 9B show an example of a first and a second fluorescence microscopy image acquired simultaneously detecting, respectively, the beam along the optical axis of the varifocal lens and the beam off axis.

DETAILED DESCRIPTION

Figure 1:
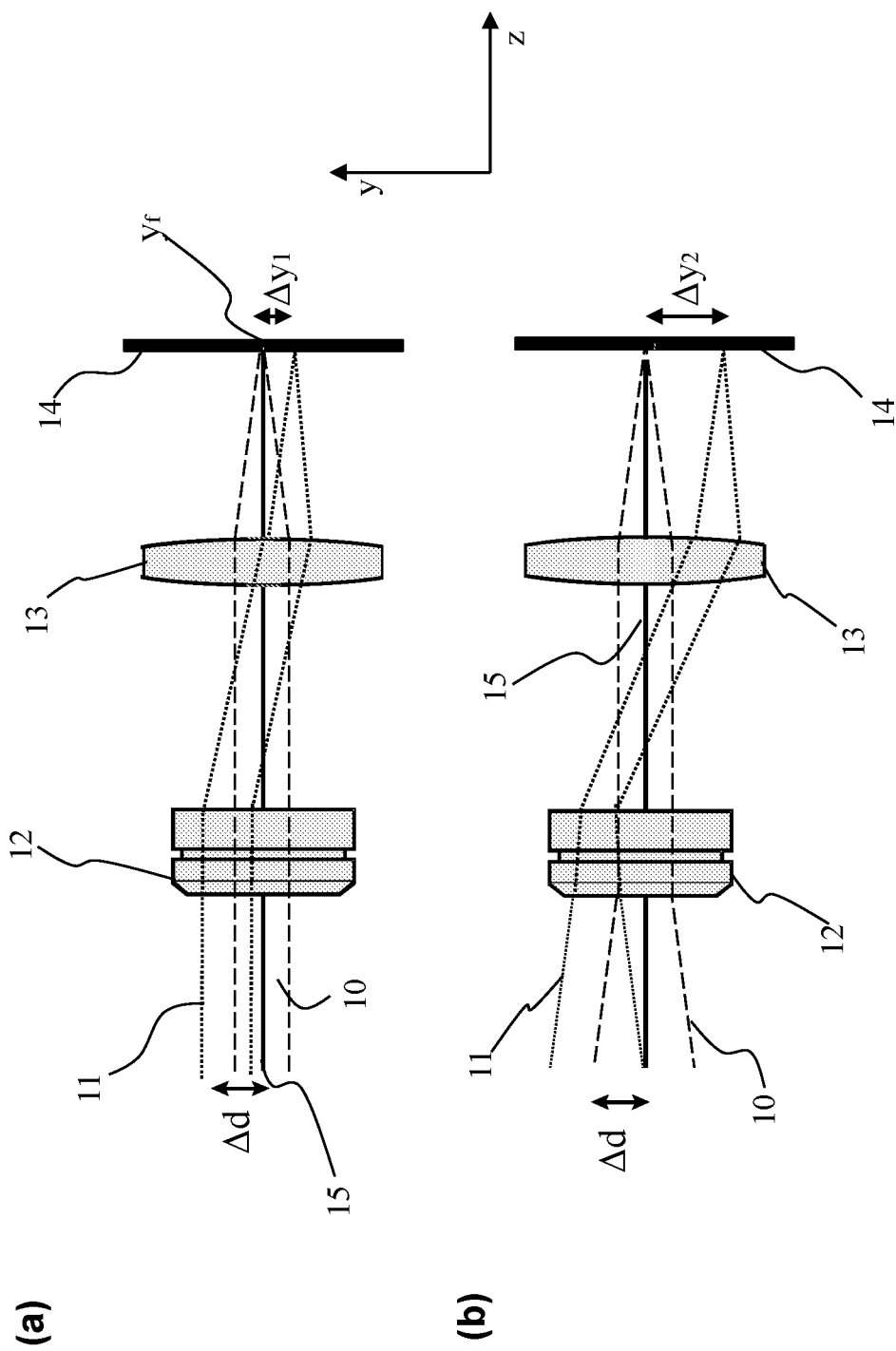
FIGS. 1(a) and 1(b) schematically illustrate the operating principle constituting the basis of the method and apparatus in accordance with the present disclosure.

FIGS. 1(a) and 1(b) schematically illustrate the operating principle constituting the basis of the method and apparatus in accordance with the present disclosure. With reference to FIG. 1(a), in an optical detection system of a microscope, downstream of the objective lens (not shown), a varifocal lens 12 is optically coupled to an optical detection system of a microscope. The detection system comprises a tube lens 13 arranged along the direction of detection (not shown in detail) that defines an image plane 14. As per se generally known, the tube lens is configured to focus a parallel light beam (i.e. subjected to infinite imaging) exiting the objective lens at an intermediate image plane 14, whereon the photodetector is positioned. The varifocal lens 12 is positioned in a conjugate plane of the rear focal plane of the objective lens of the microscope and is aligned with the optical axis of the objective lens. A first optical beam 10, indicated with a dashed line, for example a beam of fluorescent light emitted by an object, is aligned with the optical axis 15 of the varifocal lens, along the direction of detection, and passes through the tube lens to be then detected by the photodetector device in a position in the ($x_f$, $y_f$) image plane in the image plane 14 (x,y), the coordinate $y_f$ whereof is visible in the figure. The position of a point in the image plane is conventionally defined by the coordinate in the image plane of maximum intensity of the point spread function (PSF) that describes the response of an imaging system and its spatial resolution.

A second optical beam 11, synchronous with the first beam and generated by the same emitter object passes through the varifocal lens 12 off axis with respect to the optical axis of the lens, parallel to the optical axis 15 and at an offset distance $\Delta d$ therefrom. In the case shown in the figure, the offset of the second beam in a plane perpendicular to the optical axis is along a y direction. As described in more detail below, the first and the second beam originate from the splitting in two beams of the fluorescent/scattered light emitted by the object itself. The decentralization of the optical axis causes a "deflection" of the collimated beam that emerges from the lens 12 at an angle ϑ (not indicated in the figure) with respect to the direction of incidence of the collimated beam on the varifocal lens. The angle ϑ depends on the focal length of the lens 12, $f_{TL}$, and on the distance Δd of the optical axis of the beam 11 from the optical axis 15 of the beam in axis 10, in accordance with the relationship:

$$\tan\vartheta = \frac{\Delta d}{f_{TL}} \quad (1)$$

Following the deflection of the beam off axis 11, the image of the object formed on the detector will be displaced, along the y axis of the image plane, by a quantity Δy, indicated with lateral displacement. In the optical configuration of FIG. 1, $$\Delta y = f_t \cdot \tan\vartheta, \quad (2)$$

wherein $f_t$ is the focal length of the tube lens.

The lateral displacement contains the information about the axial position along an axis z perpendicular to the image plane.

In FIG. 1(a), it is assumed that the object is in a position $z_1$ that corresponds to a lateral displacement $\Delta y_1$, while in FIG. 1(b) it is assumed that the object is in a position $z_2$ represented by a lateral displacement $\Delta y_2$.

As described in more detail below, the optical parameters of the optical elements downstream of the objective lens are represented by constant quantities for a given optical configuration of the microscope and there is a linear relationship between the lateral displacement Δy and the axial displacement Δz, $$\Delta y = C \cdot \Delta z, \quad (3)$$

where C is a conversion factor, which depends linearly on Δd, $f_t$ and the focal length of the objective lens. An axial displacement Δz in the direction of incidence of the light on the photodetector can be calculated with sufficient accuracy from the focal parameters. In a preferred embodiment, the conversion factor is determined in a calibration step.

Taking an arbitrary axial plane as the reference plane $z_0=0$, it is possible to write the equation (3) as $$\Delta y = C \cdot z_p, \quad (4)$$

wherein $z_p$ is the axial position relative to the axial reference plane.

It is noted that, if the offset distance Δd from the optical axis is unchanged, as indicated in FIGS. 1(a) and 1(b), once an optical configuration of the beam in axis and of the offset beam is selected, the position of the object can be tracked both in the plane of the image and along the axis z.

Figure 2:
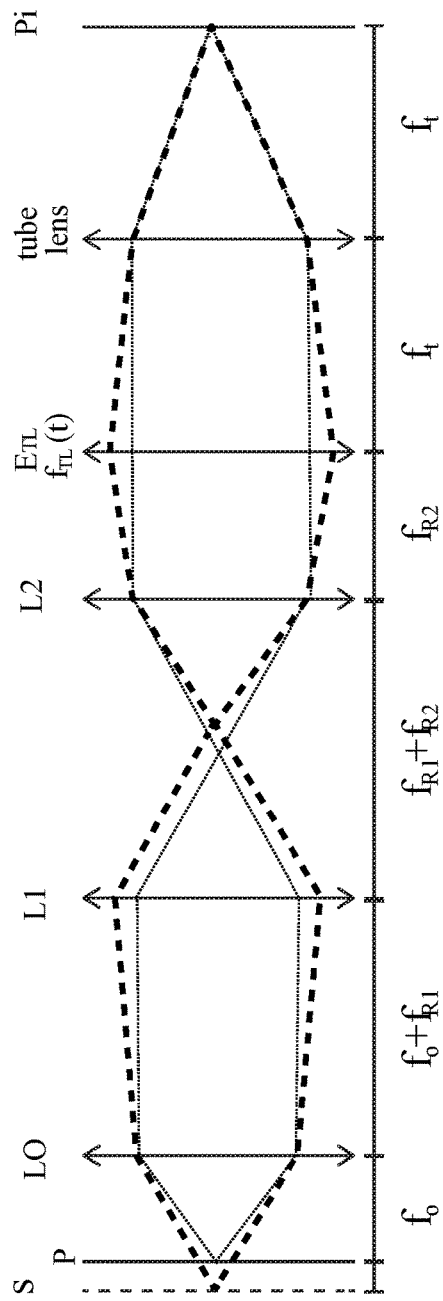
FIG. 2 is an optical diagram of a telecentric microscope that comprises a varifocal lens and a relay optical unit.

FIG. 2 is an optical diagram of a telecentric microscope for the production of an EDOF image by means of a varifocal lens. The optical system comprises an objective lens LO with focal length $f_o$, a relay optical unit formed by a first converging lens L1 and a second converging lens L2 with respective focal lengths $f_{R1}$ and $f_{R2}$. The microscope further comprises a varifocal lens with focal length $f_{TL}$ and a tube lens with focal length $f_t$. The focal plane of the object, P, is indicated, as well as the image plane, Pi, whereon is focused the image of the object by means of the tube lens. The lens L1 is positioned at a distance from the rear focal plane of the objective that is equal to $f_{R1}+f_o$.

According to a mathematical approach for calculating the focal properties in a microscope in parallax conditions, per se known, that is based on the use of the ABCD matrix for tracking a light beam, the position of a focal point s is given by the equation:

$$s = \frac{-M_R^2 f_o^2}{f_{TL}} + f_o \quad (5)$$

wherein $M_R$ is the magnification ratio, $M_R=-f_{R1}/f_{R2}$, which defines the magnification of the relay optical unit. The corresponding displacement in the axial position, Δz, with respect to the initial position $f_o$ of the focus, is:

$$\Delta z = \frac{M_R^2 f_o^2}{f_{TL}} \quad (6)$$

where a positive value of Δz implies a movement towards the objective lens.

In FIG. 2, an optical path at depth z=0 is shown with a dotted line, while the optical path indicated with the dashed line refers to an axial position displaced by a quantity Δz. Combining the equations (1), (2) and (6), the conversion factor C is expressed, $$C=(f_t \cdot \Delta d/M_R^2 \cdot f_o^2) \quad (7).$$

Once the optical parameters of the optical detection system of the microscope are set, the conversion factor is a proportionality constant.

In some preferred embodiments, the conversion factor is determined in a calibration step wherein a non-movable emitter object is detected by the beam in axis and by the decentralized beam in a plurality of axial positions having known values and obtained displacing the object only along the axis z. A respective plurality of lateral displacements is then determined, corresponding to said plurality of axial positions, determining the quantity Δy in the two images formed by the first and by the second beam. The interpolation function of the pairs of discrete values (Δy, z) is used as a calibration function Δy(z) for determining the correspondence between a determined value of lateral displacement Δy and the axial position $z_p$ of the particle. Preferably, the varifocal lens is arranged on a conjugate plane of the objective lens, in particular it is arranged at or in proximity to the rear conjugate plane of the objective lens in such a way as to maintain substantially constant the magnification of an object on the image plane due to the variation of the focus.

Preferably, $M_R$ is selected to be equal to 1, i.e. the relay unit has 1:1 magnification, thereby making the variation of the focal plane of the varifocal lens possible without introducing a magnification of the object on the image plane.

It is understood that the present invention can use a telecentric optical system with $M_R$ different from 1. If the optical system does not comprise a relay optical unit, it is preferable to offset the magnification effects within the EDOF, for example by modifying the focal length of the tube lens, in order to increase the tracking precision of the particle.

The Applicant has observed that the present approach makes it possible to maintain an approximately constant localization precision over the entire EDOF. The extended field depth can be adjusted electronically by controlling the focal length of the varifocal lens, e.g. selecting the current signal applied to the lens. It is further noted that, varying the constant C, for example varying the offset distance Δd of the second beam from the optical axis of the lens, it is possible to adjust the precision in the axial localization $z_p$.

The offset of one of the two secondary beams with respect to the optical axis of the varifocal lens can be along the axis y or along the axis x of a plane perpendicular to the optical axis so as to produce a lateral displacement $\Delta y$ or a lateral displacement $\Delta x$, respectively, on the image plane. Also in the case of simultaneous detection of a beam in axis and of a beam decentralized along the axis x, the relationships (3) and (4) apply, in particular $\Delta x = C \cdot \Delta z$ or $\Delta x = C \cdot z_p$. The displacement of the position of the particle on the image plane, $\Delta r$, deriving from an offset distance given by the relationship (6) with x and y different from zero, wherein the position O of coordinates (0,0) corresponds to the optical axis, is not necessarily a lateral displacement on one of the two coordinates of the image plane, but more generally a displacement in the plane, e.g. it can be "diagonal" with respect to the real position of the particle in the image plane. More generally, the relative displacement $\Delta r$ on the image plane is given by $$\Delta r = \sqrt{\Delta x^2 + \Delta y^2} \qquad (8).$$

In this case, too, there is a linear relationship between the displacement $\Delta r$ of the planar coordinates of the emitter particle and the axial displacement of the particle along the axis z perpendicular to the image plane that is given by $\Delta r = C' \cdot \Delta z$, with the proportionality constant $C' = \sqrt{2} C$.

A lateral displacement both in x and in y is determined by an offset distance of the second beam from the optical axis of the varifocal lens both in x and in y.

Figure 3:
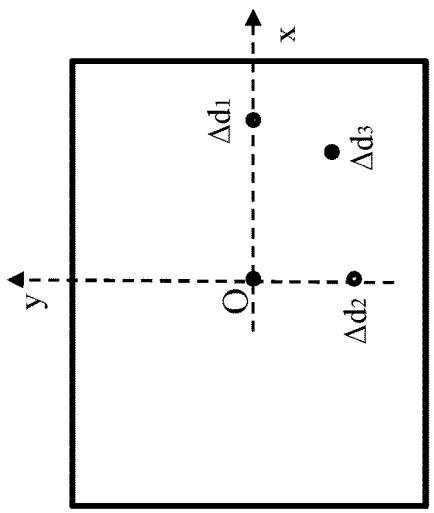
FIG. 3 is a schematic representation of a perpendicular plane to the optical axis z of coordinates (x,y) with origin O in the optical axis of the varifocal lens.

FIG. 3 is a schematic representation of a plane perpendicular to the optical axis of the varifocal lens of coordinates (x,y) with origin O in the optical axis in the direction z. The optical axis of a lens is generally defined as a straight line that passes through the geometric centre of the lens and joins the respective centres of curvature of the surfaces of the lens through which an optical beam passes. In the figure, three possible offset distances from the optical axis of the decentralized beam are exemplified: a distance $\Delta d_1$ along the axis x, $\Delta d_2$ along the y axis and $\Delta d_3$ that is defined by an offset from the origin both on the x axis and on the y axis. Since the direction of incidence of the optical beams on the detector device is typically perpendicular to the two-dimensional array of pixels on which the light is collected, the plane indicated in FIG. 3 is typically parallel to the image plane.

The point of incidence of the second optical beam on the varifocal lens with respect to the optical axis of the lens can be selected by a user, for example by means of an optical system for directing at least one of the two secondary beams. Without thereby limiting the present invention, in the description that follows reference will be made to a lateral displacement $\Delta y$, wherein y is generally one of the two coordinates of the image plane.

Figure 4:
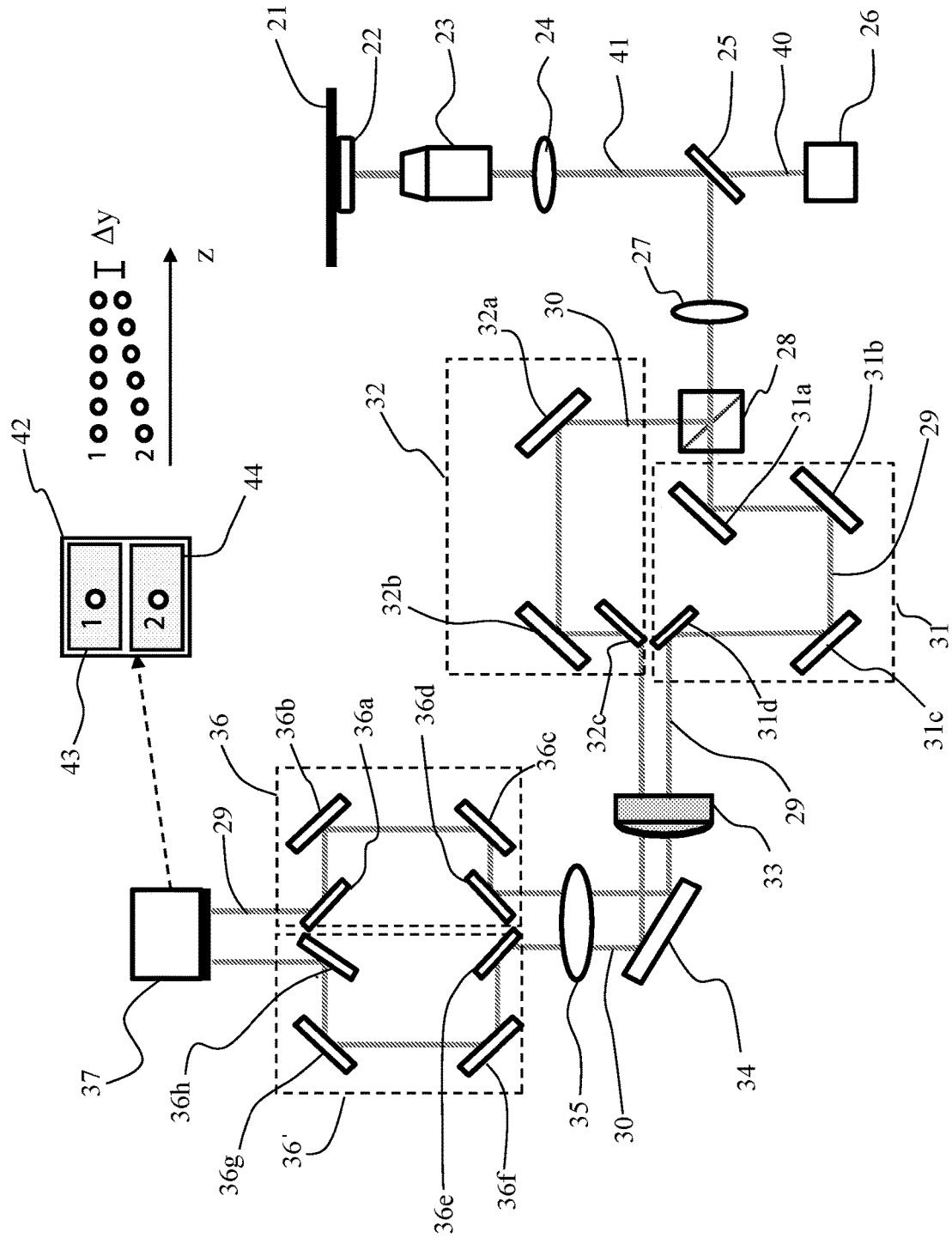
FIG. 4 is a schematic diagram of a microscopy apparatus, in accordance with an embodiment of the present invention.

FIG. 4 is a schematic representation of a microscopy apparatus for determining the individual position of a particle that emits light (scattered or fluorescent) in a three-dimensional space, in accordance with an embodiment of the present invention. A light source 26 configured for emitting a laser beam 40 that illuminates a sample, which contains dispersed emitting particles, such as molecules or cells dispersed in a biological sample. For example, the emitting particles can be fluorescent proteins bonded or conjugated to the surface of cells for the imaging of the cells. The emitting objects are preferably nanometric, with typical dimensions that vary from a few nm, for example if the tracked particle is a fluorescent protein, to a few hundreds of nm. The sample is contained in a sample holder 22 arranged on a translation system 21 along the axes (x,y,z) for the lateral positioning of the sample with respect to the incident beam emitted by the laser source 26 and for focusing the particles in the optical microscope, as described below. For example, the translation system is a piezoelectric position transducer.

The apparatus of FIG. 4 is used with the light field or fluorescence imaging technique. In the case of fluorescence microscopy, the sample contains chemically excitable species and the light source 26 is a lamp or a laser source. If the collected light is light scattered by the particles, the light source 26 is a laser source configured to emit a collimated beam at a determined wavelength in the visible spectrum.

Figure 5:
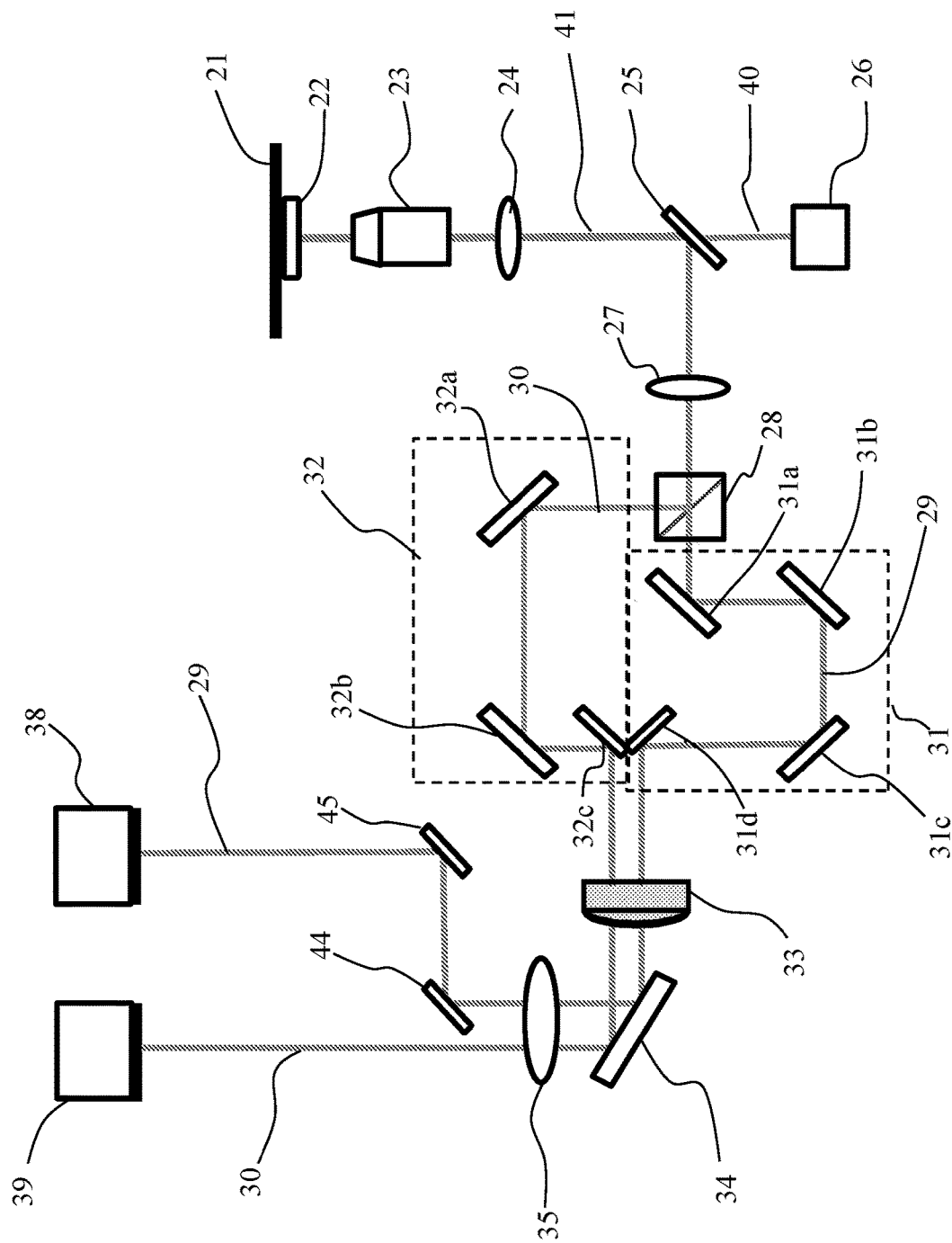
FIG. 5 is a schematic diagram of a microscopy apparatus, in accordance with a further embodiment of the present invention.
Figure 6:
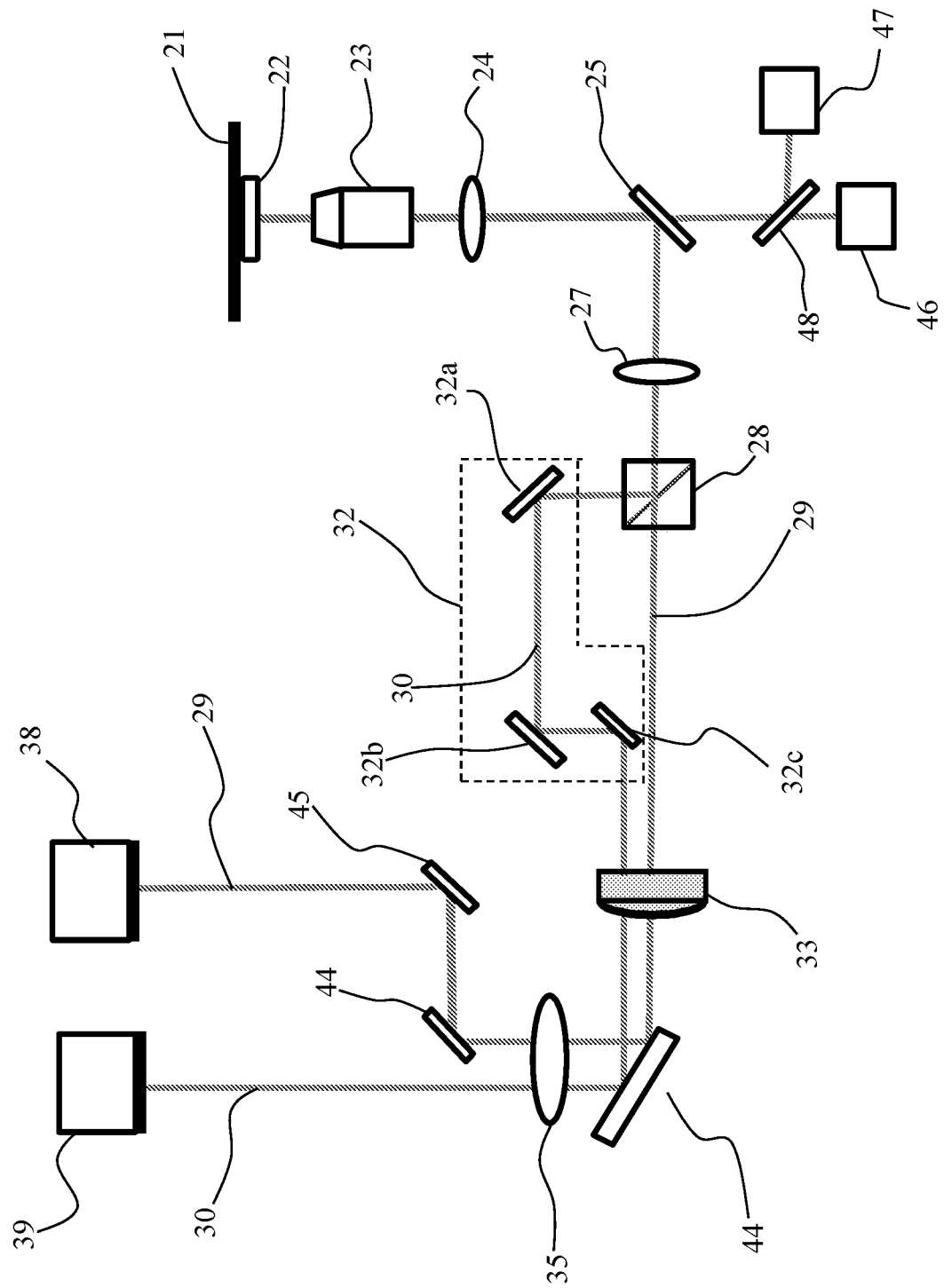
FIG. 6 is a schematic diagram of a microscopy apparatus, in accordance with another embodiment of the present invention.

In the examples shown in FIGS. 4-6, the microscopy apparatus comprises an inverted microscope in epi-illumination, which makes it possible to display the cells even on non-transparent supports. However, the method in accordance with the present disclosure can also be applied on an upright microscope.

The fluorescent light emitted or the light scattered by the sample is collected by a microscope objective lens 23 configured to focus the light emitted by the sample in a primary optical beam that is directed towards a first converging lens 24.

Preferably, the objective lens 23 has high numerical aperture (NA), inasmuch as a greater numerical aperture generally implies a greater focusing of the beam of fluorescent or scattered light. In some embodiments, the numerical aperture of the objective lens is between 0.90 and 1.49, preferably greater than 1.2.

A first optical deflection element 25 is positioned downstream of the first lens so as to receive the light that passed through the first lens 24. In the case of fluorescent light, preferably, the first optical deflection element 25 is a dichroic mirror that is so configured as to reflect the beam emitted by the sample and transmit the beam coming from the light source, e.g. laser source. The optical features of the dichroic mirror are selected as a function of the wavelength of the laser beam that hits the sample and of the optical spectrum of fluorescence or of emission of the particles. In the case of measurement of light scattered by the particles, the first deflection element can be a beam splitter.

Without thereby limiting the present invention, hereafter for the sake of brevity reference will mainly be made to fluorescence microscopy. The beam of fluorescent light or of light scattered by the sample will be indicated as secondary beam.

The fluorescent light is deflected by the dichroic mirror 25 towards a second converging lens 27 to enter a beam splitter 28 configured for dividing in power the light beam in a first secondary optical beam 29 and a second secondary optical beam 30. For example, the beam splitter is a 50:50 splitter.

The first and the second converging lens 24, 27, arranged between the objective lens 23 and the beam splitter 28, form a relay optical unit. As is generally known, a relay optical unit produces a shadow image of the object in a first intermediate focal plane of the first converging lens 24 and this shadow image is magnified by the second converging lens 27 to produce a magnified image projected on a second intermediate focal plane, i.e. a conjugate image plane. The magnification ratio depends on the focal lengths of the two relay lenses and it is preferably selected to be equal to 1:1. Preferably, the first lens 24 is positioned at distance from the rear focal plane of the objective lens that is equal to the sum of the focal length of the objective lens and of the focal length of the lens itself.

Preferably, the relay optical unit is a telecentric optical system from the image side on the rear focal plane of the objective lens. For example, the telecentric system is an optical system $4f$, wherein the first lens 24 and the second lens 27 have a same focal length, $f_1=f_{R1}=f_{R2}$, and are arranged at an optical distance equal to $2f_1$ from each other.

Downstream of the beam splitter 28, with respect to the direction of propagation of the secondary beam of fluorescent light, is arranged a varifocal lens 33 with electronically tunable focal length. The varifocal lens has an optical axis. The maintain constant the magnification of an object on the image plane for the different values of focal length, the varifocal lens 33 is arranged on the conjugate plane of the rear focal plane of the objective lens 23 and the magnification factor is defined by the focal lengths of the relay lens unit 24, 27.

The microscopy apparatus is so configured that the first secondary optical beam 29 impinges on the varifocal lens in axis (i.e. along the optical axis) and the second secondary beam 30 impinges thereon along a direction parallel to the optical axis, at an offset distance Δd from the optical axis of the lens.

Since a beam splitter typically introduces a bifurcation of the incoming optical beam, the two beams emerge from the splitter along optical paths with two different directions. Therefore, the direction of at least one of the two beams generally needs to be modified so as to be parallel to the direction of the other beam when it impinges on the varifocal lens. Moreover, depending on the specific configuration according to which the main optical elements are arranged, it is possible that the optical path of one or of both of the beams has to be modified, for example translated and/or deflected, so as to enter into the varifocal lens in the correct position in axis or off axis.

In the embodiment of FIG. 4, the first optical beam 29 passes through a first beam-directing optical unit 31 configured to direct the first beam 29 towards the varifocal lens 33 along the optical axis of the lens. In the illustrated example, the first directing optical unit 31 consists of a set of mirrors, in particular four mirrors 31a, 31b, 31c and 31d.

The second optical beam 30 passes through a second beam-directing optical unit 32 to deflect the beam and direct it towards the varifocal length 33 along a direction parallel to the optical axis of the lens at an offset distance Δd from the optical axis. In the illustrated example, the second directing optical unit 32 consists of a set of three mirrors 32a, 32b and 32c.

It is understood that the first and the second directing optical unit 31, 32 can comprise a single directing optical element, e.g. a mirror or a prism, or a plurality of mirrors/prisms in a different number from the illustrated ones.

The first and the second directing optical unit are generically indicated as beam-directing optical system, which is configured to direct at least a secondary optical beam exiting the beam splitter. It is understood that the present invention is not limited to the configuration of the directing optical system able to deflect one or both optical beams in the desired direction, e.g. towards the varifocal lens or towards the at least one photodetector device, or to the presence of a directing optical system for both secondary beams of fluorescent or scattered light. Since the two secondary beams originate from the splitting in two of the fluorescent light or of the light scattered by the same object, it is possible to obtain the synchronization between the two beams with no need for complex synchronization systems.

In ways known in themselves, the focal length of the varifocal lens is controlled by means of adjusting elements operatively connected to the lens. Typically, the focal length is electronically controllable by means of an actuator (electrical, mechanical or electromagnetic) connected to a current or voltage regulator that supplies current/voltage from zero to a maximum value. The control of the focal length is for example achieved by means of an electrical control signal with variable amplitude. In the usual ways, the current or voltage supplied to the actuator can be controlled electronically by a software, for example integrated in an electronic control system of the microscopy apparatus, which can also control other elements, such as the sample translation system, the lighting and shutting off of the light source and the photodetector device. Although it is not shown in the figures, the varifocal lens comprises an actuator that controls its focal length, wherein the actuator is connected to a current or voltage regulator, in turn connected to an electronic control unit (which are also not shown in the figure). In these embodiments, the actuator and the current/voltage regulator constitute the adjusting elements.

For example, the varifocal lens 33 is a TAG Lens™ or an electronically tunable lens produced by Optotune AG or by Varioptic.

The microscopy apparatus comprises a tube lens 35 arranged downstream of the varifocal lens 33 with respect to the optical path of the secondary beams 29 and 30 exiting the varifocal lens and configured in such a way as to receive the first beam 29 and the second beam 30, optionally after said beams have been deflected by a deflection element 34, e.g. a mirror.

A photodetector device 37 is arranged along the optical path of the first and second secondary beam 29, 30, downstream with respect to the tube lens 35. The photodetector device is arranged on a detection plane, indicated as the image plane, which coincides with a main focusing plane of the tube lens.

The photodetector device preferably is a two-dimensional image sensor that comprises a two-dimensional array of photosensitive elements (pixels), more preferably a photocamera or CCD or CMOS digital television camera. The image sensor is set to have a determined exposure time or integration time, which is defined to be the time during which the photosensitive elements of the sensor can collect the incoming photons for the acquisition of an image. The image sensor is characterised by a frame rate approximately equal to the reciprocal of the exposure time. To a change in the focal length of lens 33 corresponds a displacement of the position of the focal plane along the optical axis of the varifocal lens. Since the varifocal lens is arranged along the optical path of the beams between the objective lens 23 and the tube lens 35, the change of the focal length introduced by the varifocal lens 33 causes a displacement of the focal plane defined by the tube lens. As noted above, the positioning of the varifocal lens at or in proximity to the rear conjugate plane of the objective lens allows to maintain substantially constant the magnification of an object on the image plane for the values of focal length.

Preferably, the varifocal lens is controlled in such a way that the focal plane defined by the tube lens moves axially in a continuous manner from an initial position, $f_i$, to a final position, $f_f$, along the optical axis of the lens. As is generally known, the continuity of variation of signals depends on the control electronics that establish a differential variation (increases or decreases) of amplitude of the control signal of the varifocal lens between an amplitude value and the next one.

An electronic control of the focal length of the lens with tunable focal length has, in many embodiments, the advantage of achieving a relatively fast displacement of the focal plane, with controllable displacement speed.

The initial position $f_i$ and the final position $f_f$ of the displacement of the focal plane along the optical axis of the varifocal lens, hence along a direction perpendicular to the image plane are selected so that there is at least one position included in the range $[f_i, f_f]$ whereat the focal plane of the tube lens corresponds to the image plane on which the detector device is arranged. In this way, if the integration time of the detector device is greater than or equal to the travel time of the focal plane in the interval $[f_1, f_f]$, a single image captured by the detector device is an integration of 2D projections in the image plane of a 3D object in focus or out of focus. The control signal of the varifocal lens is preferably a frequency modulated analogue electrical signal at a $v_{TL}$ that determines the displacement speed of the focal length $f_{TL}$ and hence an axial displacement of the focal plane formed by the tube lens. In particular, the speed of the displacement of the focal plane, $v_{fs}$, is a function of the frequency of the control signal of the tunable lens, $v_{TL}$, and/or of the distance $\Delta f_{TL}=(f_f-f_i)$ traveled by the beam during a scan:

$$v_{fs}=2\cdot(f_f-f_i)\cdot v_{TL}. \tag{9}$$

At constant axial travel distance $\Delta f_{TL}$, a frequency increase implies an increase in the axial displacement speed. The modulation frequency of the control signal of the varifocal lens is selected in such a way that the scan $\Delta f_{TL}$ takes place in a time that is lower than or equal to the integration time of the photodetector device.

In the embodiment of FIG. 4, the image sensor 37 comprises two detection areas (not shown) arranged on the image plane, separated to have a physical separation between two secondary optical beams that impinge respective thereon. In particular, the sensor comprises a first and a second detection area. The image sensor is configured for the synchronous acquisition of images generated, respectively, by the first and by the second area of the sensor. The image sensor is therefore configured to generate two synchronous digital images of a same object, that occupies a determined position in the image plane (x,y).

Preferably, the sensor image is an Electron Multiplying Charge-Coupled Device with photoactive area divided in two detection regions.

When the varifocal lens 33 is shut off, the first and the second optical beam 29, 30 form an identical image of a 3D object in the first and in the second area of detection of the image sensor, i.e. the 2D projections of the object on the image plane (x,y) are identical. It is understood that with the varifocal lens off, the EDOF effect in the captured image is absent. When the varifocal lens 33 is on, a scan is carried out of the focal length of the focal length of the varifocal length in a time $T_{TL}=1/v_{TL}$ that is lower than or equal to the integration time of the photodetector device and hence a (synchronous) scan of the focal position of the first and of the second secondary beam through the image plane. For example, assuming a longitudinal scan of the focal length, the change of the focal length over time is given by:

$$f_{TL}(t)=\frac{f_{min}}{\sin\left(\frac{2\pi}{T_{TL}}t\right)} \tag{10}$$

wherein $f_{min}$ is the minimum focal length of the varifocal lens, corresponding to an end of the axial range $[f_i, f_f]$, $f_{min}=f_i$.

The EDOF can be expressed with the sum of the original field depth (i.e. with the varifocal lens off), DOF, and of the range of focal positions scanned in the travel time $T_{TL}$ $$EDOF=DOF+\frac{M_R^2 f_0^2}{f_{TL}}. \tag{11}$$

The second beam 30, that passes off axis through the varifocal lens, undergoes a deflection and the position of the object in the image formed on the detector is displaced, along the y axis of the image plane, by a quantity $\Delta y$ (as exemplified in FIGS. 1(a) and 1(b)). Two images are then detected, wherein the object, in the same instant, occupies two different positions in the image plane (x,y), wherein the position of the object in each image is defined by the coordinates of maximum intensity of the luminous spot that represents the object in the image. In particular, the object in the image formed by the first secondary beam in axis is in a position (x, $y_1$), while the object in the image formed by the second secondary beam is in a position (x, $y_2$), wherein $(y_1-y_2)=\Delta y$.

The lateral displacement $\Delta y$ can be calculated starting from the localization of the particle in each of the two images.

The evolution of the axial position $z_p$ of the particle over time is calculated on the basis of the time evolution of the lateral displacement of the position of the particle in the second image with respect to its position in the first image, for example using an algorithm based on the analysis of the cross correlation between the images relating to the two channels. Alternatively, a Gaussian sub-pixel interpolation algorithm can be used.

For example, the lateral displacement $\Delta y$ can be calculated using a localization algorithm described in A. Small and S. Stahlheber, "*Fluorophore localization algorithms for super-resolution microscopy*", Nature Methods 11, 267-279 (2014).

Using a calibration function $\Delta y(z)$ it is possible to calculate the axial position associated with a lateral displacement $\Delta y$.

Since the detection areas of a single image sensor, albeit spatially separated, are usually physically close, the microscopy apparatus preferably comprises an additional directing optical system configured to direct the first optical beam 29 towards the first detection area and the second optical beam 30 towards the second detection area.

In the embodiment of FIG. 4, the microscopy apparatus comprises a third directing optical unit 36 configured to direct the first optical beam 29 in the first detection area of the sensor 37 and a fourth directing optical unit 36' configured to direct the second optical beam 30 in the second detection area of the sensor 37. In the illustrated example, the third directing optical unit comprises four mirrors 36a, 36b, 36c and 36d, while the fourth directing unit comprises four mirrors 36e, 36f, 36h and 36g.

The third and the fourth directing optical unit 36, 36' constitute the beam directing optical system of the embodiment of FIG. 4, which is configured to direct at least a secondary optical beam (in this case both beams) coming from the tube lens 35. It is understood that the present invention is not limited to the presence or to a particular configuration of the directing optical system adapted to deflect one or both optical beams in the desired direction.

In ways known in themselves, an image acquisition processor (not shown), integrated with the photodetector device or logically connected thereto, is adapted to digitise the output analogue signal of each detection area of the device and to store a respective digitised acquired image collected from each detection area. The acquisition processor transmits the digital images to an electronic image processing unit 42 that comprises a processor apt to process numerically the digital images and a memory. The electronic image processing unit is connected to an image display unit that comprises a first screen 43 for displaying the image captured in the first detection area and a second screen 44 for displaying the image captured in the second detection area.

The electronic image processing unit is integrated or is connected to a data processor (not shown) configured to process the data that come from the image processing unit, in particular to execute the calculations for the determination of $\Delta y$ from the analysis of the first and of the second image and to calculate the axial position corresponding to the relative displacement $\Delta y$. The electronic image processing unit and the data processor are generically indicated as a data processing device, e.g. a PC, that is connected to a photodetector device.

By way of example and in a schematic manner, to the right of the image display screens 43, 44 are indicated the "1" and "2" y coordinates for a sequence of pairs of synchronous images, collected at successive times. The difference along the y coordinate of the image plane (x,y), $\Delta y$, between the "1" position in the image collected in the first detection area for the optical path in axis and the "2" position in the image collected in the second detection area for the optical path off axis provides the information on the position along the axis z. The time evolution of the difference between the y coordinates in the two images makes it possible to determine the displacement of the object along the axis z, $z(\Delta y)$, in accordance with Eq. (4). More generally, the tracking of the position 3D of the emitting particle over time is given by the coordinates $(x, y, z(\Delta y))$.

FIG. 5 shows a microscopy apparatus according to an additional embodiment of the invention. Equal numbers indicate elements equal to those shown in FIG. 3 or having the same functionalities. With respect to the embodiment of FIG. 4, the apparatus of FIG. 5 comprises a first detector device 38 for detecting the first secondary beam 29 in axis with respect to the lens and a second photodetector 39 for detecting the second secondary beam 30 off axis. Optionally, one or both secondary beams 29, 30 pass through one or more deflection elements that direct them towards the respective photodetector devices. In FIG. 5, a pair of mirrors 44, 45 forms a directing optical system that deflects the first secondary beam 29 directing it towards the first photodetector device 38.

The first and the second photodetector devices are synchronized so as to allow a synchronous acquisition of the first secondary beam 29 and of the second secondary beam 30 forming two respective images of the object relating to a same instant in time. Synchronization is achieved for example through an external trigger pulse transmitted to each of the two photodetector devices, as described for example in page 6031 of the publication by S. Ram et al., previously cited. Preferably, the first and the second photodetector device are identical.

Each of the photodetector devices 38, 39 is connected to a data processing device (not shown) configured to numerically process the digital images and to analyse the images determining the respective positions of the emitter object in the processed first and in the second images and the relative displacement of the position in the image plane and to calculate the axial position of the emitter object on the basis of the relative displacement of the positions in the two images. Preferably, the data processing device is configured to associate the position (x,y) in the image plane detected by the first photodetector device and the position z calculated on the basis of the displacement relative to the 3D position of the object.

The method for tracking particles according to the present disclosure can advantageously be applied to "super-resolution" (SR) imaging techniques. SR microscopy generally allows to obtain a higher resolution than the diffraction limit by analyzing in sequence particles that are too close to be distinguished in a co-focal image that detects them simultaneously. An example of a known imaging technique that uses SR microscopy is described in George Patterson et al. "*Superresolution Imaging using Single-Molecule Localization*", Annual Review of Physical Chemistry", vol. 61 (2010), pages 345-367, which concerns the microscopy for the localization of" a single molecule. Single-Molecule Localization Microscopy (SMLM) operates on particles that have an emission state, i.e. ON state, wherein they are visible because they generate a fluorescent signal, and a dark state, wherein they do not emit any signal, i.e. the OFF state. For example, the sample is a fluid solution that contains a distribution of molecules containing fluorophores. Preferably, the transition between the two states is optically induced. For example, a light beam in the UV spectrum activates in a group of particles the transition towards the emission state, while a light beam in the visible spectrum induces in the particle the passage from the emission state to the OFF state. The regions in which the molecules emit fluorescent light can be selected to have smaller dimension than the diffraction limit so as to allow an image below the diffraction limit.

An additional example of imaging technique (SR) is the RESOLFT (Reversible Saturable Optically Linear Fluorescence Transition) method, wherein the sample is illuminated with a non-homogeneous intensity distribution that comprises intensity zeros creating molecule regions in a dark state or regions of molecules in an illuminated state.

FIG. 6 shows a microscopy apparatus in accordance with another embodiment of the invention. Equal numbers indicate elements equal to those shown in FIG. 4 or in FIG. 5 or having the same functionalities. In the present embodiment, the microscopy apparatus is configured to operate with an SR microscopy technique, in particular with the SMLM method. The microscopy apparatus comprises a first source 46 of UV light and a second source 47 of light in the visible spectrum. A second dichroic mirror 48 is positioned downstream of the first and of the second source, in such a way as to receive the light from the first or from the second source, and upstream of the first dichroic mirror 25. The second dichroic mirror 48 is configured to let selectively pass the light coming from the first source and from the second source, so as to switch the emission of a group of particles of the sample between the ON and OFF states. With respect to the embodiments of FIGS. 4 and 5, in FIG. 6 the first beam 29 exiting the beam splitter 28 impinges on the varifocal lens 33, in axis with respect thereto, without passing through an optical element or an optical deflection unit. The second beam 30 is deflected by a directing optical unit 32, already described above. It is understood that the directing optical system downstream of the beam splitter 28 of the embodiment of FIG. 6 can be implemented in the microscope configurations of FIGS. 4 and 5.

EXAMPLES

The method according to the present disclosure was implemented in a commercial wide-field inverted microscope (Nikon Ti) that comprises an oil immersion objective lens, infinite with 100× magnification and numerical aperture of 1.4 (Nikon 100× Plan Apo VC 100×/1.4 DIC N2), a high light intensity lamp with emission of light at 350-800 nm, a piezoelectric translation system (Mad City Lab) for the translation of the sample along the axis z, and an EMCCD television camera (DU897DCS-BV, Andor Technology; dimension of one pixel 16×16 µm²). The components of the commercial microscope were used to build an inverted microscope having an optical configuration described with reference to FIG. 4. The apparatus comprised: a dichroic mirror 25 configured to let pass the light with excitation wavelength at 488 nm and reflect the fluorescent light at 655 nm; a 50:50 beam splitter, a telecentric optical unit, formed by the converging lenses 24 and 27, with a same focal length of 200 mm; a length with electronically tunable focal length (Optotune, EL-10-30), positioned in a conjugate plane of the rear focal plane of the objective lens. Two directing optical units 31, 32, each having four adjustable mirrors allowed the adjustment of the direction of the two secondary beams independently. In this way, the optical path of the second beam could be directed in such a way as to be able to change the offset distance with respect to the optical axis of the varifocal lens. In the present example, the off-axis fluorescent light beam was decentralized in the y axis of a plane perpendicular to the optical axis of the varifocal lens by a distance $\Delta d=5$ mm in such a way as to generate a displacement along y of the position of the particle in the image created by the second secondary beam.

Two additional directing optical units, each having four mirrors, were arranged downstream of the varifocal lens to focus each of the images in two separate regions of the EMCCD. During the experiments, the integration (exposure) time of the television camera was 100 ms and the frame rate 10 fps.

The control signal of the varifocal lens was a triangular signal modulated at a frequency $v_{TL}=10$ Hz. The continuous variation interval of the focal length was from $f_1=-600$ mm to −infinity and from +infinity to $f_2=+285$ mm.

The images acquired from the two separate regions of the photodetection area of the EMCCD was pre-processed to remove noise. In particular, a median filter and a Gaussian smoothing filter were applied to each acquired image. For a more immediate display of the two image portions associated respectively to the in-axis beam and to the off-axis beam (for example using different colours), each image acquired was divided in two vertically superposed halves, imposing the coordinates of the images so that the origin of the axial displacement, z=0, corresponds to the ordinate (y axis of the image plane) wherein the images of the two channels are superposed, i.e. $\Delta y=0$. It is understood that the selection of the origin of the axial displacement is arbitrary.

The two detection regions are also indicated below with two detection channels.

For the construction of a calibration function, which was then utilised to convert the $\Delta y$ values into respective values of position z in a particle, a calibration was carried out using non-movable microsphere of known dimension. In particular, a sample was analysed which comprised fluorescent microspheres ("beads") of about 500 nm of diameter diluted in a solution of purified and deionized water (Milli-Q®) with $1:10^3$ dilution factor. The microspheres used were TetraSpeck™ 500 nm, produced by Thermofisher, with four emission peaks at 360/430 nm (blue), 505/515 nm (green), 560/580 nm (orange) and 660/680 nm (dark red). A drop containing microspheres in solution was fixed on a coverslip using ε-polylysine.

FIGS. 7A and 7B show the experimental PSF in the plane (y,z) for the positions measured with the beam in axis, while FIGS. 7C and 7D show the experimental PSF for the positions with the beam off axis, wherein he PSF was obtained acquiring a series of images in time sequence. During the acquisition, the coverslip whereon the microsphere was fixed was displaced only along the z axis, maintaining unchanged its position on the plane (x,y) so as to simulate a movement of the particle only along the axis z. Images were acquired of an isolated microsphere in 24 image plane separated from each other by 500 nm during the axial displacement along z of the slide and hence of the microsphere by means of the piezoelectric system. Translation along the z axis was through a total interval of 12 µm. For each axial position, 50 images were acquired. A calibration curve of the axial position as a function of $\Delta y$ was obtained. This curve was interpolated with a linear function and the angular coefficient of the interpolating straight light was taken as the conversion factor C between the lateral displacement and the axial depth, in accordance with Equation (4).

The images of FIGS. 7A and 7C were acquired with the varifocal lens off, while the images of FIGS. 7B and 7D were acquired with the varifocal lens on. It can be observed that the varifocal lens on produced a PSF elongated by approximately 12 µm (EDOF). Therefore, each microsphere that moved within the EDOF could be localized with high precision. It is further observed that the PSF of the decentralized beam of FIG. 7D is inclined in the plane (y,z), while the PSF of the in-axis beam of FIG. 7B moves along the axis of translation z of the particle. The inclination of the decentralized beam enclosed the information about the displacement along the axis z.

FIG. 8 is a series of portions of images, wherein each image portion shows the position of a microsphere acquired with the beam in axis and with the optical beam off axis during the lateral displacement induced by the axial displacement of a microsphere, with negative and positive z coordinate with respect to z=0 in a range from −6 µm a +6 µm, in accordance with the above description. The luminous spots indicated with "I" relate to the beam in axis, while the spots indicated with "O" relate to the decentralised beam. In z=0, the positions of the microsphere are superposed. It is observed that the displacement is induced only on the second channel (decentralized beam), i.e. only the luminous spot "O" is displaced, while the position y of the microsphere in the first channel (spot "I") remains unchanged.

FIGS. 9A and 9B show an example of two portions of a fluorescence microscopy image acquired detecting, respectively, the in-axis beam (top image, FIG. 9A) and the off-axis beam (lower image, FIG. 9B) in two distinct regions of the detection area of the EMCCD. A small square highlights, both in the top image (first image of the object) and in the bottom image (second image of the object), the region of interest that comprises a fluorescent microsphere detected with the in axis and off axis beam in a position (x,y). The position in x displayed on the image plane remains unchanged in the two channels, while along the y axis the particle occupies two distinct positions in the two images, whose distance is equal to $\Delta y$. The separation between the two displayed microspheres (in fact, the same microsphere that occupies different positions in the two images) contains the information about the axial position.

In the instant of detection exemplified in the images of FIGS. 9A and 9B the position 3D of the particle is given (x, $y_1$, $z(\Delta y)$), with $\Delta y=(y_1-y_2)$.

The x and y coordinates of the microsphere were obtained from the image of the channel with the optical beam in axis, measuring a respective (i.e. along each of the two axes) relative position of the luminous spot with respect to a simulated Gaussian spot with apparent dimension $\delta_1$ and positioned at the centre of a first region of interest (ROI1) that contains the particle. The lateral displacement $\Delta y$ was calculated using an algorithm based on the analysis of the cross-correlation between the images related to the two channels.

The workflow of the localization algorithm described in the present example is shown schematically, not in all its steps, in figures from 10A to 10D.

Figures 10A, 10B, 10C:
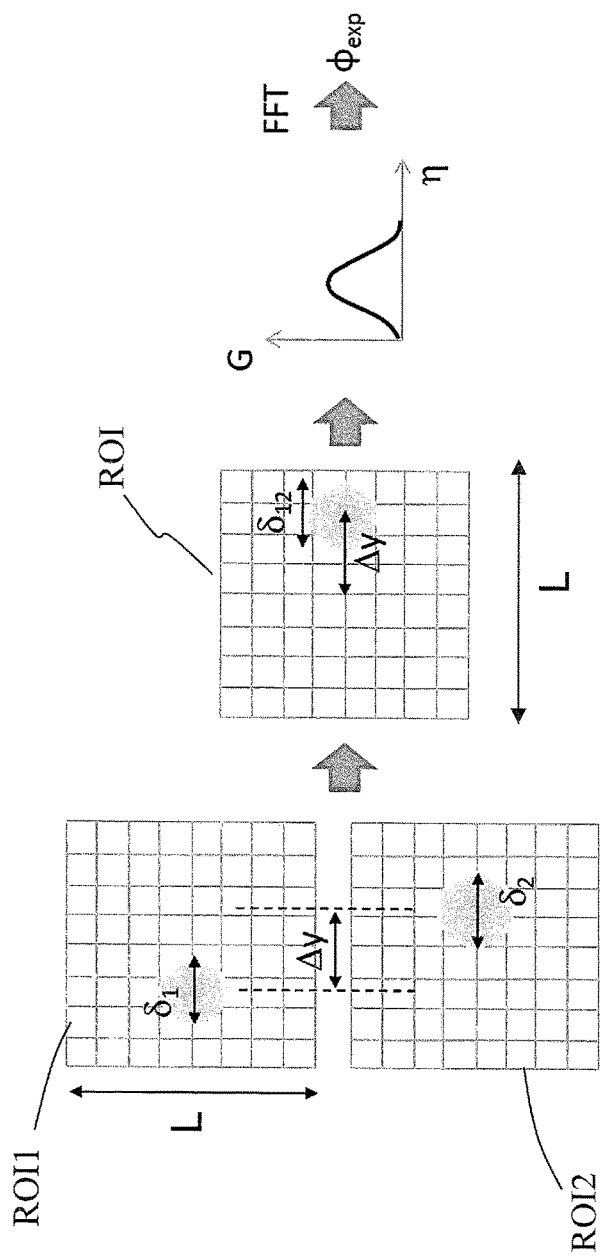
FIGS. 10A to 10D schematically show the work flow of the localization algorithm used to determine the lateral and axial displacement of a particle, in accordance with an exemplary embodiment of the present invention.

A respective region of interest, which contains the first and the second particle, was defined in both images. FIG. 10A schematically shows the first and a second region of interest, ROI1 and ROI2, with dimension L×L, for the two detection channels of a particle.

The apparent dimension of the first and second particle $\delta_1$ and $\delta_2$ in the image of the corresponding channel that are separated by a distance $\Delta y$ was determined using an image correlation spectroscopy algorithm. The algorithm is based on the principle that the shape of the cross-correlation function, $G_{12}(\eta)$, of the images of a first and second particle that are at a mutual distance along a direction, depends both on the distance $\Delta y$ and on the apparent dimensions $\delta_1$ and $\delta_2$ of the two particles, which are displayed in the images as luminous spots. This approach was used assuming that the microsphere detected with the beam in axis is the first particle of apparent dimension $\delta_1$, a Gaussian spot positioned at the centre of ROI1, and the apparent dimension spot $\delta_2$, a Gaussian spot positioned at the centre of ROI2, relates to the second particle, in reality the same microsphere detected with decentralized beam.

Figure 10D:
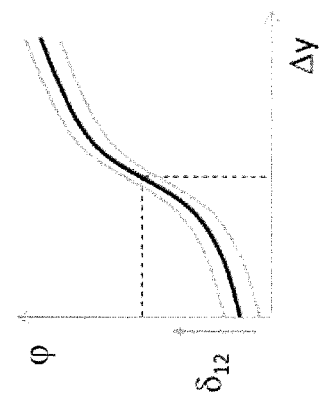

Based on the two spots of dimension $\delta_1$ and $\delta_2$, separated by a distance $\Delta y$ (FIG. 10A), a Gaussian spot with dimension $\delta_{12}=(\delta_1+\delta_2)/2$ was simulated, offset, with respect to the centre of a region of interest (ROI) with dimension L×L, by a same quantity $\Delta y$ along the direction of separation and equal to the distance of the position of the particle between the images of the 2 channels (FIG. 10B). A profile 1D was generated for the spot $\delta_{12}$ in the ROI and the Fast Fourier Transform (FFT) was applied to the profile 1D to obtain a parameter of phase $\varphi$ corresponding to the value of lateral displacement $\Delta y$. The calculation procedure $\delta_{12}$, generation of a profile 1D and application of the FFT was repeated for the lateral displacements corresponding to different distances from the centre of the ROI, calculating each time a respective phase parameter $\varphi$. At the end of this process, a univocal correspondence between values of lateral displacement and values of the phase parameter was obtained, represented by a reference function $\varphi(\Delta y)$, shown in FIG. 10D.

The cross-correlation function of the images of the two particles, $G_{12}(\eta)$, the profile 1D of said function and the FFT of the profile 1 were then calculated, obtaining a phase parameter $\Phi\exp$ (FIG. 10C) that contains the information of the lateral displacement of the particle in the phase space. Through a comparison of $\Phi\exp$ with the reference curve $\varphi(\Delta y)$ previously obtained, the corresponding value of $\Delta y$ is determined.

For the mathematical calculations described above, a commercial software programme was used (MATLAB®).

Figure 11:
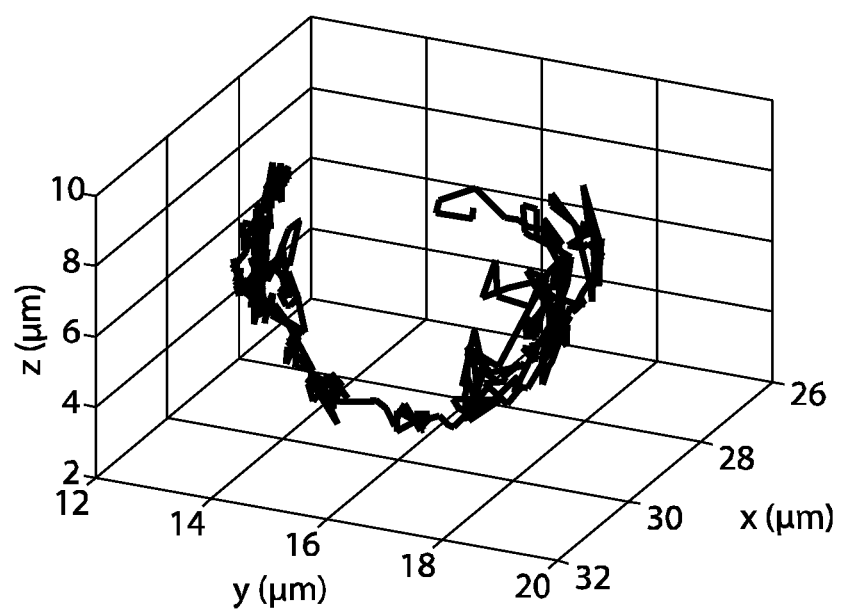
FIG. 11 shows the evolution over time of the 3D position of a single fluorescent particle on the superficial membrane of neurons in vivo, in which the particle was coupled to a neuronal ionotropic receptor GABAA, in accordance with an exemplary embodiment of the invention.

FIG. 11 shows the evolution over time of the position 3D of a single fluorescent particle on the superficial membrane of a neuron in vivo of approximately spherical dimension of a few microns along the axial dimension. In particular, the experiments were focused on the 3D tracking of the ionotropic neuronal receptors GABAA, which are known to scatter rapidly on the neuronal membrane. The tracked particle were carboxyl quantum dots (QD) Qdot® 655 ITK™, produced by Thermofisher, having a diameter of approximately 40 nm and an emission spectrum centred at 655 nm. The QDs were coupled to the receptors by means of a primary antibody. During the experiments the cells were immersed in an extra-cellular liquid. Images of the scattering of the QD on the neuronal somatic region were acquired. The localization precision was 30 nm in the lateral direction, i.e. on the image plane (x,y), and 60 nm in the axial direction, with the proportionality constant C=2.7 pixel/μm.

FIG. 11 shows in particular the 3d trajectory traveled by a single GABAA receptor containing the sub-units α1 that scatters along the surface of the soma in a hippocampal neuron in culture. In a time interval of 45s, the particle traveled through the entire trajectory, visiting a portion of somatic region that extends by approximately 4-6 μm along the three axes x, y and z.

The invention claimed is:

1. Microscopy method for determining the position of an emitter object in a three dimensional (3D) space which comprises:
    a) illuminating an emitter object so as to cause an emission of scattered light or fluorescent light from the emitter object;
    b) focusing the emitted light in a primary focused optical beam through an objective lens;
    c) splitting the primary optical beam in a first secondary beam and in a second secondary beam;
    d) directing the first and the second secondary beam through a varifocal lens, having an optical axis, along respective optical paths such that the first secondary beam impinges on the varifocal lens along a direction corresponding to said optical axis and the second secondary beam impinges decentralized on the varifocal lens at an offset distance $\Delta d$ from the optical axis and along a direction parallel to the same, in which the varifocal lens has an electronically controllable focal length,
    e) electronically controlling the focal length of the varifocal lens changing the focal length through a range of focal length values so as to move the respective focal positions of the first and second beam along said optical axis through said range of focal length values in a predetermined travel time,
    f) simultaneously acquiring a first image and a second image of the emitter object in an integration time greater than or equal to the travel time of the focal positions simultaneously detecting the first secondary beam in-axis and the decentralized second secondary beam in respective first detection area and second detection area arranged on an image plane (x, y);
    g) analyzing the first and the second image for determining a first object position on the first image and a second object position on the second image and determining a relative displacement $\Delta r$ in the image plane (x, y) of the position of the object in the two images, and
    h) determining an axial position $z_p$ of the emitter object along an axis z perpendicular to the image plane on the basis of the relative displacement $\Delta r$.

2. Method according to claim 1, further comprising, after step h):
    i) associating the coordinates defined by the first position on the image plane (x, y) and by the axial position $z_p$ with the 3D position of the emitter object.

3. Method according to claim 1 wherein, in step h), the axial position $z_p$ is determined on the basis of a linear relationship between $z_p$ and $\Delta r$.

4. Method according to claim 1, which further comprises, subsequently to focusing the light emitted in a primary optical beam and prior to splitting the primary optical beam into a first secondary beam and into a second secondary beam, directing the primary optical beam through a relay optical unit having a magnification ratio, the relay optical unit being arranged on a rear focal plane of the objective lens.

5. Method according to claim 1, wherein the varifocal lens is arranged on a conjugate plane of the rear focal plane of the objective lens.

6. Method according to claim 1, wherein the offset distance $\Delta d$ of the second secondary beam from the optical axis of the varifocal lens is such as to cause a lateral displacement $\Delta r = \Delta y$ between the first and the second position of the emitter object along one of the two of the image plane coordinates (x, y).

7. Method according to claim 6 wherein, in step h), the axial position $z_p$ of the emitter object along axis z is determined according to a linear relationship $\Delta y = C\ z_p$, wherein C is a conversion factor.

8. Method according to claim 1, wherein the step of simultaneously acquiring a first image and a second image of the emitter object comprises simultaneously acquiring a plurality of respective first and second images at successive instants so as to trace the 3D position of the object over time.

9. Method according to claim 1, wherein simultaneously acquiring is carried out by a two-dimensional image sensor which comprises an array of photosensitive elements which extend in the image plane (x, y) in a detection area which comprises the first detection area and the second detection area.

10. Method according to claim 1, wherein simultaneously acquiring comprises acquiring the first secondary beam through a first two-dimensional image sensor and acquiring the second secondary beam through a second two-dimensional image sensor, wherein the first and the second two-dimensional image sensors are mutually synchronized and each image sensor comprises a respective array of photosensitive elements defining a respective first and second detection area in the image plane (x, y).

11. Method according to claim 1, wherein:
splitting the primary optical beam into a first secondary beam and a second secondary beam comprises transmitting the primary beam through a beam splitter configured for power-splitting the beam, and
the beam splitter is configured in such a way as to produce a first secondary beam and a second secondary beam which propagate along two distinct directions not parallel to each other and step d) comprises directing at least one between the first and the second secondary beam through a directing system configured such that the first and the second secondary beam, in output from the directing optical system, propagate along two distinct and mutually parallel directions.

12. Microscopy apparatus for determining the position of one or more emitter objects in a three dimensional (3D) space which comprises:
an objective lens configured for collecting light emitted by an emitter object and focusing the emitted light in a primary light beam;
a beam splitter arranged for receiving the primary optical beam and configured for power-splitting the primary optical beam in a first secondary optical beam and a second secondary optical beam;
a varifocal lens with electronically tunable focal length and having an optical axis, the varifocal lens being arranged downstream of the beam splitter;
an optical beam directing optical system for directing at least one between the first secondary optical beam and the second secondary optical beam, the directing optical system being arranged between the beam splitter and the varifocal lens and configured such that the first and the second secondary beams in output from the directing optical system, propagate along two distinct and mutually parallel directions;
at least one photodetector device arranged so as to receive the first and the second secondary beam in output from the varifocal lens, wherein
the varifocal lens and the directing optical system are arranged in such a way that the first secondary optical beam impinges on the varifocal lens along its optical axis and the second secondary optical beam impinges on the varifocal lens decentralized along a direction parallel to the optical axis and at an offset distance $\Delta d$ from the same, and
the at least one photodetector device is configured for simultaneously detecting the first secondary beam and the second secondary beam on a respective first and second detection area to form at least one two-dimensional image in an image plane (x, y), which comprises respective first image of the emitter object formed on the first detection area by the first beam in axis and the second image of the same emitter object formed on the second detection area by the second decentralized beam.

13. Apparatus according to claim 12, wherein the varifocal lens is configured to be electronically controlled by setting a variation in the focal length through a range of focal length values so as to move the respective focal positions of the first and second beam along the optical axis of the varifocal lens through said range of focal length values in a predetermined travel time and the at least one detector device is configured for forming the at least one two-dimensional image in an integration time greater than or equal to the travel time.

14. Apparatus according to claim 12, which further comprises:
a relay optical unit positioned on a rear focal plane of the objective lens (23) and arranged in such a way as to receive the primary optical beam upstream of the beam splitter, the optical relay unit being configured for transferring an image formed by the objective lens to an image plane conjugate with a magnification ratio.

15. Apparatus according to claim 14, wherein the relay optical unit is a telecentric optical system with a magnification ratio of 1:1.

16. Apparatus according to claim 12, wherein the varifocal lens is arranged on a conjugate plane of the rear focal plane of the objective lens.

17. Apparatus according to claim 12, which further comprises a data processing device connected to the at least one photodetector device configured for:
receiving the first image and the second image of the emitter object;
analyzing the first and the second image for determining a first position of the object on the first image and a second object position on the second image,
determining a relative displacement $\Delta r$ in the image plane (x, y) of the position of the object in the first and in the second image;

determining an axial position $z_p$ of the emitter object along an axis z perpendicular to the image plane on the basis of $\Delta r$, and associating the coordinates defined by the first position on the image plane (x, y) and by the axial position $z_p$ with the position (x, y, z) of the emitter object.

* * * * *